Patented Jan. 2, 1945

2,366,620

UNITED STATES PATENT OFFICE 2,366,620

PROCESS FOR THE PRODUCTION OF POLY-OLEFINS

George W. Hearne and George A. Stenmark, Berkeley, Calif., assignors to Shell Development Company, San Francisco, Calif., a corporation of Delaware No Drawing. Application February 12, 1940, Serial No. 318,632

12 Claims. (Cl. 260—680)

The present invention relates to the production of poly-olefins and halogen acids by a thermal, non-catalytic dehydrohalogenation of non-vinyl type monohalogenated unsaturated hydrocarbons. The term "non-vinyl type monohalogenated unsaturated hydrocarbons," as employed herein and in the appended claims, covers unsaturated hydrocarbons having one or more unsaturated linkages, the halogen atom of such hydrocarbons being attached to a saturated carbon atom. These hydrocarbons, also, must contain a hydrogen atom on a carbon atom linked to the halogenated carbon atom. The above term also includes monohalogenated unsaturated hydrocarbons, which may be of the alkyl, aryl or aralkyl type provided such hydrocarbons contain an aliphatic radical containing at least one olefinic linkage, a halogen atom attached to a saturated carbon atom of such aliphatic radical, and a hydrogen atom on a carbon atom linked to the halogenated carbon atom.

In one of its specific embodiments, the invention provides a process for the production of aliphatic diolefins by the thermal, non-catalytic dehydrohalogenation of non-vinyl type monohalogenated aliphatic mono-olefins of the above defined class. As is well known, aliphatic diolefins may be, in general, readily polymerized to form rubber-like products which are capable of being vulcanized and worked like natural rubber, and which exhibit desirable properties in many respects superior to those of natural rubber. Because of the superiority of these synthetic rubbers in certain respects to the natural product, these aliphatic diolefins, and particularly those which contain two double bonds or unsaturated linkages in conjugated relationship with respect to each other, have been employed on a small scale for the commercial production of various synthetic rubbers. Typical examples of such aliphatic diolefins with conjugated double bonds, are butadiene-1,3, isoprene, methyl isoprene, and the like, their homologues and analogues. Heretofore, one of the main difficulties which prevented the widespread production and use of these relatively more desirable synthetic products has been the lack of cheap methods of producing the aforementioned aliphatic diolefins having unsaturated linkages in conjugated relationship with respect to each other.

The monohalogenated aliphatic mono-olefins of the class defined above, because of their availability and low cost, have been looked upon as one of the logical raw materials for the preparation of cheap and plentiful supplies of diolefins. Several processes have been proposed for the conversion of the aforementioned unsaturated monohalides to the corresponding poly-olefins, all of these methods, as will be shown below, being uneconomical for commercial use. These previously known processes may be generally grouped into three distinct classes, namely:

1.—Chemical removal of halogen acid by means of basic agents;
2.—Catalytic dehydrohalogenation under acidic conditions; and
3.—Pyrolysis of the monohalogenated olefins in the presence of steam.

There are a number of known processes for the removal of halogen acids by means of a basic agent. As such agent, it has been proposed to use soda lime, caustic potash, sodium ethylate, and the like, either in aqueous or alcoholic solutions. All of these processes have the same disadvantages in that they consume considerable quantities of reagents, preclude the recovery of the halogen acid removed from the unsaturated monohalide, and give low yields of the corresponding poly-olefin.

Processes of the second class, which involve the catalytic dehydrohalogenation of the starting material, overcome to a certain extent the main disadvantages of the chemical dehydrohalogenation by means of basic agents, the catalytic processes avoiding the use and therefore the consumption of the basic reagent and permitting the recovery of the halogen acid. However, in catalytic dehydrohalogenation there always occurs considerable polymerization to tars and decomposition to coke. Therefore, even when the dehydrohalogenation is effected in the presence of the catalysts at the lowest operative temperatures, the catalysts employed deteriorate rapidly, and must consequently be frequently replaced or rejuvenated. Such a procedure, obviously, is impractical and uneconomical since it requires the interruption of the operations, and increases the cost of producing the poly-olefins.

As to the third class of processes for the production of poly-olefins, it has been proposed to execute the dehydrohalogenation of the above and other halogenated compounds at temperatures higher than those necessary for the catalytic dehydrohalogenation, and to effect this reaction in the absence of the catalyst. However, in order to avoid the decomposition to tars and carbon and to assist in the reaction, it was proposed to employ substantial quantities of steam. Such dehydrohalogenation, although overcoming most of the difficulties and disadvantages of the above described processes, is in itself also uneconomical. For instance, the presence of a hot mixture of halogen acid and water vapors in the reaction vessel will cause corrosion difficulties unless special and costly equipment is employed. Also, in order to render a dehydrohalogenation process highly economical, it is preferable that the halogen acid may be recovered in a usable form. On the other hand, when the dehydrohalogenation is effected by pyrolysis in the presence of steam, the halogen acid can be recovered only as a dilute aqueous solution which is of very little value unless it is subjected to subsequent concentration.

It is thus seen that the heretofore known processes for the dehydrohalogenation of the defined class of monohalogenated unsaturated hydrocarbons, and particularly of the described monohalogenated aliphatic mono-olefins, to the corresponding diolefins having conjugated unsaturated linkages, have proven to be too uneconomical for commercial use. This is substantiated by the fact that the various diolefins, and particularly the valuable aliphatic diolefins with conjugated double bonds of the type of butadiene are chiefly produced from other sources, such as by the cracking of petroleum hydrocarbons, by synthesis from acetylene through acetaldehyde, acetaldol and butylene glycol, and/or by synthesis from ethanol and acetaldehyde.

It is therefore the main object of the present invention to provide a simple, practical and economical process for the production of hydrocarbons comprising or containing aliphatic poly-olefinic radicals or chains wherein the unsaturated or olefinic linkages are preferably in conjugated relation with respect to each other. A further object is to provide a novel process for the economic production of aliphatic diolefins, and particularly of butadiene. A still further object is to provide a process for the efficient production of aliphatic poly-olefins with conjugated double bonds from inexpensive and available monohalogenated aliphatic olefins. Another object of the invention is to provide a process whereby diolefins, such as butadiene, isoprene and the like, may be economically produced in relatively large yields, by subjecting the corresponding monohalogenated aliphatic mono-olefins to dehydrohalogenation, such process allowing the recovery of the halogen acid in the anhydrous state or, at least, in the form of solutions of high concentrations. Other objects include the provision of such a process wherein the difficulties encountered by the formation of tar and coke are substantially avoided, and in which it is not necessary to employ catalysts, alkalies, steam, or other reagents, the use of which was heretofore deemed essential. Still other objects of the invention will be apparent from the following disclosure and description.

It has now been discovered that the above and other objects may be attained by subjecting hydrocarbons comprising or containing non-vinyl type monohalogenated unsaturated chains, and particularly the hydrocarbons comprising or containing non-vinyl type monohalogenated aliphatic mono-olefinic chains, to non-catalytic dehydrohalogenation in the substantial absence of water and/or of basic reagents. It has been further discovered that by entirely disregarding the teachings of the prior art and by effecting the dehydrohalogenation non-catalytically, without the use of basic reagents, and in the substantial absence of water, at quite elevated temperatures, the difficulties heretofore encountered due to the polymerization of the poly-olefins and the formation of tar and coke are diminished instead of being increased as would be normally expected. It has been still further found that the dehydrohalogenation of non-vinyl type monohalogenated aliphatic mono-olefins may be executed non-catalytically and in the substantial absence of water, and that these conditions, other variables being adjusted to effect the optimum or desirable dehydrohalogenation, are not only most favorable for the best yields of diolefins, but also allow a simpler, practical and considerably more economical process for the production of diolefins with conjugated double bonds, as compared to any process heretofore disclosed.

The invention may therefore be stated to reside in producing hydrocarbons comprising or containing poly-olefinic chains by subjecting the vapors of hydrocarbons comprising or containing non-vinyl type monohalogenated unsaturated chains, in the substantial absence of basic reagents and of water, to suitably elevated temperatures in the absence of a catalyst, thereby effecting the non-catalytic dehydrohalogenation of the vapors, and separately recovering the dehydrohalogenated poly-olefinic hydrocarbons and the halogen acid from the effluent vapors. Although the present process is applicable for the thermal, non-catalytic dehydrohalogenation of the above described class of monohalogenated unsaturated hydrocarbons, it will be described with particular reference to the production of butadiene from crotyl chloride and/or methyl vinyl carbinyl chloride which may be formed, for example, by the substitution of chlorine into butylene, or by the partial dehydrochlorination of dichlor-paraffins of the type of 2,3-dichlorbutane, 1,3-dichlorbutane, or the like. It is to be understood, however, that there is no intention to be limited to the production of butadiene-1,3, since other monohalogenated, such as mono-brominated, unsaturated hydrocarbons having one or more unsaturated linkages, a halogen atom linked to a saturated carbon atom, and a hydrogen atom on a carbon atom linked to the halogenated carbon atom, may also be treated in accordance with the present process to produce economically high yields of the corresponding poly-olefins. For example, the 3,3-dimethyl allyl halides, in which the halogen atom may be a chlorine, bromine or iodine atom, may be dehydrohalogenated in accordance with the present invention to isoprene, there being an allylic rearrangement during or immediately following the removal of the halogen acid. It is to be noted, however, that all of the hydrocarbons comprising or containing the monohalogenated unsaturated chain, which hydrocarbons may be dehydrohalogenated by the thermal, non-catalytic treatment must be of the non-vinyl type, the resulting poly-olefinic hydrocarbons having at least two double bonds, mostly in conjugated relation to each other.

As stated, the non-vinyl type butenyl chlorides may be produced by the chlorination via substitution of buylene. Excellent yields of both crotyl chloride and methyl vinyl carbinyl chloride may be obtained, for example, by the chlorination of straight-chain butylenes at relatively elevated temperatures of about 500° C. These two chlorides are also found, although in smaller quantities, when butylenes are subjected to chlorination at temperatures of between about 20° C. and 100° C. Either of these two unsaturated monochlorides may be dehydrochlorinated according to the present process to butadiene-1,3, it being noted that crotyl chloride and methyl vinyl carbinyl chloride (3-chlor-butene-1) undergo allylic rearrangement when heated to elevated temperatures, such rearrangement occurring even at about 200° to 300° C.

In its most simple aspect, the present process consists in continuously passing the vapors of the appropriate monohalogenated unsaturated hydrocarbon of the described class, such as crotyl chloride, 3-chlor-butene-1, 3,3-dimethyl allyl bromide, or the like, in the substantial absence of water through a non-catalytic chamber maintained at a suitable temperature, the halogen acid and the produced poly-olefin being then recovered from the effluent vapors. The process may be realized in conventional apparatus of widely varying design. For instance, the primary material may be vaporized in a separate vaporizer or in the fore section of a reaction tube, the vapors being then passed continuously or otherwise through an unpacked tube maintained at the desired or optimum temperature.

Although the process may be carried out by effecting the dehydrohalogenation in unpacked reaction tubes, these may also be filled or partly filled with a suitable packing material, the packed tubes, in certain cases, being advantageous because they afford a better heat transfer and a larger surface upon which the reaction may occur. It is to be noted, however, that the packing material should not tend to catalyze the dehydrohalogenation reaction since such catalyzing materials, at the employed temperatures, will cause excessive formation of tar and coke, which may frequently plug the reaction tube. As suitabel non-catalyzing packing material, reference may be made to carbon chips, glass wool, pumice, porcelain chips, and the like.

When the vapors of any of the above described hydrocarbons comprising or containing the above defined monohalogenated unsaturated chain are conveyed through a reaction tube maintained at a sufficiently high temperature, dehydrohalogenation occurs to a greater or lesser extent depending upon the operating conditions, namely the operating temperature and the residence time, i. e. length of time that the vapors are subjected to the heat treatment. These two factors determine the degree or percentage of conversion. Although the process may be operated with low conversion rates, it is best to employ relatively high conversion rates, for instance above 50% and as much as 95% or higher, such high conversion rates producing higher poly-olefin (e. g. butadiene) yields and resulting in greater operating economy.

The operating temperature may be varied over a relatively wide range, and, by properly adjusting the residence or reaction time, it is possible to maintain any desired conversion rate. Generally, the optimum temperature is within the range of between about 450° C. and 750° C. This will, however, vary with the residence time and the specific primary material subjected to dehydrohalogenation. Temperatures much below those mentioned above are undesirable because the rate of non-catalytic dehydrohalogenation of the material in question becomes too low and impractical, while excessively high temperatures, unless the residence time is cut down considerably, effects the cracking of the carbon structure. Therefore, the upper temperature limit may be stated to be that at which substantial decomposition of the carbon structure occurs.

Aside from the poly-olefins and the halogen acid, which constitute the main reaction products, small amounts of polymerization products, carbon and some gaseous hydrocarbons are also formed during the dehydrohalogenation. These latter substances are produced by side reactions which invariably take place although to a minor extent. The by-products, as well as the desired reaction products, may be separated from the unreacted primary material by any of the known processes, such as scrubbing, solvent extraction, fractional distillation or condensation, etc. The unreacted material may be recycled for further dehydrohalogenation.

The invention will be illustrated by the following specific examples, it being understood that there is no intention to be limited by any details thereof since variations may be made within the scope of the appended claims.

*Example I*

A mixture of crotyl chloride and methyl vinyl carbinyl chloride was conveyed at a rate of about 2.8 cc. per minute through a quartz reaction tube 1.2 cm. in diameter and 56 cm. in length. The reaction temperature was maintained at about 605° C. An analysis of the effluent vapors showed that 68.8% of the primary material was converted to butadiene, while 8.6% of the applied chlorides were recovered as high-boiling polymers. The actual yield of products of dehydrochlorination was probably higher since there was a loss of about 7.4% of the chlorides, this being at least partially caused by the inefficient method of recovery and analysis of the effluent vapors. The yield of the various products, based on the chlorides consumed, was:

| | Per cent |
|---|---|
| Butadiene | 81.2 |
| High-boiling polymers | 10.2 |
| Losses | 8.6 |

*Example II*

Methyl vinyl carbinyl chloride (3-chlor-butene-1) was conveyed at a rate of about 3.7 cc. per minute through a brass reaction tube heated to about 596° C. This tube had an internal diameter of 1.6 cm. and was 56 cm. long. An analysis of the effluent vapors gave the following yields as calculated on the basis of the applied chloride:

| | Per cent |
|---|---|
| Butadiene | 74.5 |
| 3-chlor-butene-1 | 2.9 |
| Polymers | 9.5 |
| Losses | 13.1 |

In other words, 76.7% of the dehydrochlorinated material was recovered as butadiene and 9.8% as a higher boiling polymer.

The above description and the examples indicate that the present process of producing poly-olefins is superior in several important respects to the existing methods. By permitting the attainment of much higher yields, by substantially avoiding the formation of tar and coke and therefore eliminating the frequent cleaning and recharging of reaction tubes, and by eliminating the cost of catalysts, alkalies and catalyst rejuvenation, the present process is distinctly superior to the known catalytic dehydrohalogenation processes and processes utilizing alkaline agents. The dehydrohalogenation in accordance with the present process is also advantageous over the dehydrohalogenation in the presence of steam because the present process allows the recovery of the halogen acid in the anhydrous state or at least in the form of a concentrated solution thereof. These advantages, furthermore, are obtained with a minimum of carbon and tar formation and with equal and frequently superior yields of the poly-olefins. Another advantage of the present process resides in the fact that the reaction product, being substantially anhydrous, is less corrosive. Also, the present process requires considerably smaller furnaces to produce the same yield of poly-olefins, and eliminates the cost of vaporization and condensation of considerable quantities of water.

The terms "thermal dehydrochlorination" and "thermal dehydrohalogenation," as employed herein and in the appended claims, refer respectively to dehydrochlorinations and dehydrohalogenations which are effected thermally and in the absence of any catalyst and/or of a basic agent.

We claim as our invention:

1. A process for the production of butadiene which comprises subjecting the substantially anhydrous vapors of crotyl chloride to thermal dehydrochlorination at a temperature of about 600° C., and separately recovering butadiene and anhydrous hydrochloric acid from the resulting mixture.

2. A process for the production of butadiene which comprises subjecting the substantially anhydrous vapors of methyl vinyl carbinyl chloride to thermal dehydrochlorination at a temperature in the range of from 450° C. to 750° C., and recovering butadiene and anhydrous hydrogen chloride from the resulting mixture.

3. A process for the production of butadiene which comprises subjecting the substantial anhydrous vapors of a mixture of crotyl chloride and methyl vinyl carbinyl chloride to thermal dehydrochlorination at a temperature in the range of from 450° C. to 750° C., and recovering butadiene and anhydrous hydrogen chloride from the resulting mixture.

4. A process for the production of butadiene which comprises vaporizing a monohalogenated aliphatic straight-chain mono-olefin having four carbon atoms per molecule and containing a halogen atom attached to a saturated carbon atom and a hydrogen atom on an unsaturated carbon atom which latter is directly linked to the halogenated carbon atom, subjecting the substantially anhydrous vapors of said monohalogenated mono-olefin to thermal dehydrohalogenation at a temperature in the range of from 450° C. to 750° C., and separately recovering butadiene and anhydrous halogen acid from the resulting mixture.

5. A process for the production of butadiene which comprises subjecting the substantially anhydrous vapors of a monohalogenated aliphatic straight-chain mono-olefin having four carbon atoms per molecule and containing a halogen atom attached to a saturated carbon atom and a hydrogen atom on an unsaturated carbon atom which latter is directly linked to the halogenated carbon atom to thermal dehydrohalogenation at a temperature in the range of from 450° C. to 750° C., and recovering butadiene from the resulting mixture.

6. A process for the production of isoprene from 3,3-dimethyl allyl chloride, which comprises subjecting substantially anhydrous vapors of said chloride to thermal dehydrochlorination at a temperature in the range of from 450° to 750° C., but below that at which substantial decomposition of the carbon structure occurs, and recovering isoprene from the resulting mixture.

7. A process for the production of isoprene from a 3,3-dimethyl allyl halide, which comprises subjecting the substantially anhydrous vapors of said halide to thermal dehydrohalogenation at a temperature in the range of from 450° C. to 750° C., but below that at which substantial decomposition of the carbon structure occurs, and recovering isoprene from the resulting mixture.

8. A process for the production of aliphatic diolefins from monohalogenated aliphatic mono-olefins containing a halogen atom attached to a saturated carbon atom and a hydrogen atom on a carbon atom linked to the halogenated carbon atom, which comprises subjecting the anhydrous vapors of said monohalogenated aliphatic mono-olefin to thermal dehydrohalogenation at a temperature in the range of from 450° C. to 750° C., and separately recovering the aliphatic diolefins from the resulting reaction mixture.

9. A process for the production of aliphatic poly-olefinic hydrocarbons from monohalogenated aliphatic unsaturated hydrocarbons containing a halogen atom attached to a saturated carbon atom and a hydrogen atom on a carbon atom linked to the halogenated carbon atom, which comprises subjecting the substantially anhydrous vapors of said monohalogenated aliphatic unsaturated hydrocarbon to thermal dehydrohalogenation at a temperature above 450° C. but below that at which substantial decomposition of the carbon structure occurs.

10. The process according to claim 9, wherein the reaction temperature is maintained within the range of from 450° C. to 750° C., and wherein the reaction residence time is below that at which substantial decomposition of the carbon structure occurs.

11. A process for the production of hydrocarbons with aliphatic di-olefinic chains from monohalogenated mono-olefinic hydrocarbons containing a halogen atom attached to a saturated carbon atom and a hydrogen atom linked to a carbon atom adjoining the halogenated carbon atom, which comprises subjecting substantially anhydrous vapors of the monohalogenated mono-olefinic hydrocarbon to thermal dehydrohalogenation at an elevated temperature below that at which substantial decomposition of the carbon structure occurs, and separating the hydrocarbons with aliphatic di-olefinic chains from the resultant mixture.

12. A process for the production of hydrocarbons with aliphatic poly-olefinic chains from unsaturated hydrocarbons with monohalogenated unsaturated chains containing a halogen atom attached to a saturated carbon atom and a hydrogen atom linked to a carbon atom adjoining the halogenated carbon atom, which comprises subjecting substantially anhydrous vapors of the monohalogenated unsaturated hydrocarbon to thermal dehydrohalogenation at an elevated dehydrohalogenating temperature, but below that at which substantial decomposition of the carbon structure occurs, and recovering the thus produced hydrocarbons with aliphatic poly-olefinic chains from the resultant mixture.

GEORGE W. HEARNE.
GEORGE A. STENMARK.